United States Patent [19]

Shimono et al.

[11] 4,008,734
[45] Feb. 22, 1977

[54] PRESSURE RELIEF SYSTEM
[75] Inventors: Nobuo Shimono; Hideki Marubayashi, both of Kure, Japan
[73] Assignee: The Babcock & Wilcox Company, New York, N.Y.
[22] Filed: Mar. 30, 1976
[21] Appl. No.: 671,859
[52] U.S. Cl. .............................. 137/314; 285/178; 285/224
[51] Int. Cl.² ......................................... F16L 27/00
[58] Field of Search ........... 137/312, 314; 285/178, 285/223, 224, 225

[56] References Cited
UNITED STATES PATENTS

| 1,412,865 | 4/1922 | Harter | 137/314 |
| 1,631,438 | 6/1927 | Sullivan | 137/314 |
| 3,115,352 | 12/1963 | Heerlein | 285/223 X |

FOREIGN PATENTS OR APPLICATIONS 597,729  9/1959  Italy .................................. 285/225

Primary Examiner—Martin P. Schwadron
Assistant Examiner—Richard Gerard
Attorney, Agent, or Firm—J. Maguire; R. J. Edwards

[57] ABSTRACT

A vapor pressure relief system comprising a safety valve and vent pipe movable with thermal expansion and contraction of the associated vapor generator, and a fixed exhaust pipe and drip pan, the latter having an opening to admit the vent pipe and accommodate the movement thereof, and including slidable cover plates surrounding the vent pipe and providing a closure over the drip pan opening.

5 Claims, 9 Drawing Figures

PRESSURE RELIEF SYSTEM

BACKGROUND OF THE INVENTION

The invention relates to pressure relief valves which are known as safety valves and are generally used with pressurized vapor containments, and more particularly to an improvement in drip pans associated with such valves.

Pressurized vessels and conduits associated with vapor generators are equipped with safety valves which provide the means for relieving excessive vapor pressure buildup thereby precluding damage to the pressure parts. Generally, the safety valve forms part of a series of components which disposes of the released vapor either to atmosphere or to an auxiliary vessel, and includes a vent, an exhaust pipe, a hood, and a drip pan with the latter surrounding the outlet end of the vent pipe to collect condensate drippings from the released vapor. The drip pan, the hood and the exhaust pipe are normally secured to a fixed framework whereas the vent pipe is fastened to the safety valve and the latter is secured to the vessel or conduit associated therewith. It should be recognized that whenever a vapor generator is placed into or taken out of service, it and its associated vessels and conduits will undergo thermal expansion or contraction thereby causing the safety valve and vent pipe to shift relative to the drip pan and exhaust pipe, the latter two being secured to the fixed framework. It is general practice in the prior art to furnish a drip pan having an opening of considerably greater cross-sectional area than that of the vent pipe extending therethrough so as to provide the clearance necessary to accommodate horizontal movement of the vent pipe occasioned by expansion or contraction of the vapor generator, the vessels and the conduits associated therewith.

The drip pan must be dimensioned to house an annular plate which is slidably fitted to the vent pipe and is sized to maintain a closure over the drip pan opening, throughout the range of movement of the vent pipe. This prior art construction has the disadvantage of requiring a relatively large drip pan which is unsuitable for the narrow confines and limited spacing generally alloted to safety valves associated with vapor generators.

SUMMARY OF THE INVENTION

The present invention allows for a substantial reduction in the size of the drip pan when compared with that which has heretofore been required in accommodating thermal expansion and contraction of associated equipment.

Accordingly, there is provided an arrangement wherein the drip pan opening is covered by upper and lower annular plates surrounding the vent pipe. The lower plate is slidably interposed between the drip pan and the upper plate, and has an opening sized to allow for an initial movement of the vent pipe. The lower plate is itself movable to accommodate the remainder of the vent pipe movement.

DETAILED DESCRIPTION OF THE PREFERRED EMBODIMENT

Figure 1:
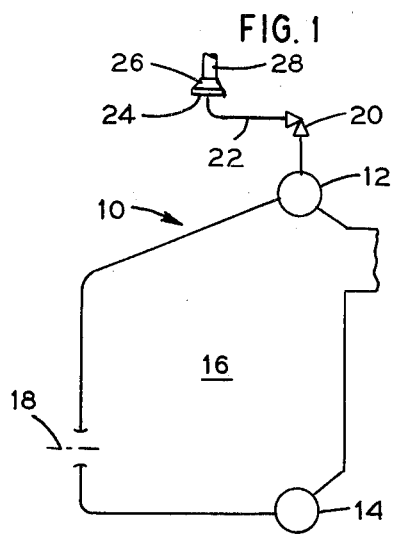
FIG. 1 is a schematic sectional elevation of a vapor generator incorporating an embodiment of the invention.

Referring to FIG. 1, there is shown a vapor generator 10 including vapor and liquid drums 12 and 14, a furnace chamber 16 and one or more burners 18 discharging fuel for combustion within the chamber 16. The vapor drum 12 is equipped with one or more safety valves 20 which relieve excessive pressure buildup within the vapor generator 10 by releasing vapor and disposing of it through a series of components including a vent pipe 22, a drip pan 24, and a hood 26 interconnecting the drip pan 24 to an exhaust pipe 28.

Figure 2:
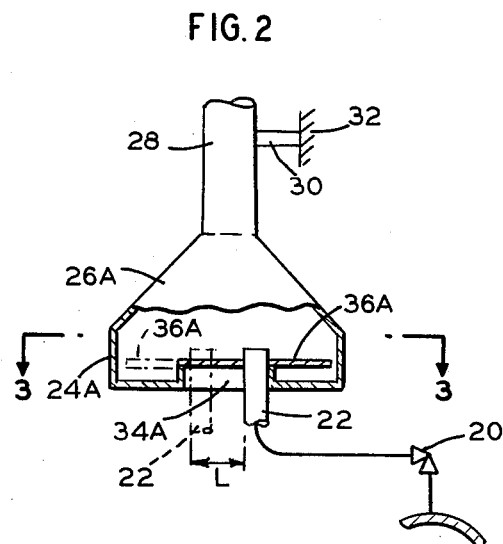
FIG. 2 is a sectional elevation of a drip pan embodying the prior art.

Referring to FIG. 2, there is shown the safety valve 20 and the vent pipe 22 associated with an outside annular shaped drip pan 24A of prior art character and including a hood 26A interconnecting the drip pan 24A to the exhaust pipe 28. The drip pan 24A, the hood 26A and the exhaust pipe 28 are joined with one another to form a unitary construction which is secured, through an appropriate brace 30, to a fixed framework 32. The drip pan opening 34A admits the vent pipe 22 and is sized to accommodate horizontal movement thereof occasioned by expansion and contraction of the vapor drum 12 and the vapor generator 10 as the latter is placed into or taken out of service. The drip pan 24A must be of adequate dimension to house an annular cover plate 36A which is slidably fitted to the outlet end portion of vent pipe 22 and is sized to maintain a closure over the drip pan opening 34A throughout the movement (L) of vent pipe 22 from its position with a cold vapor generator to the position, as shown by phantom lines, when the vapor generator 10 is fully heated.

Figure 3:
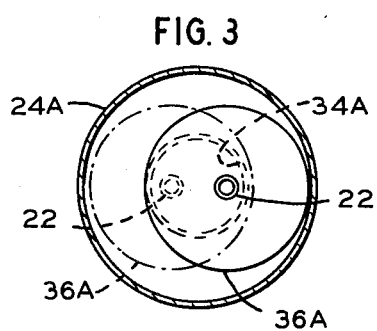
FIG. 3 is a plan view taken along line 3—3 of FIG. 2 and showing the vent pipe and cover plate positions with a cold and a fully heated vapor generator.

Referring to FIG. 3, there is shown the drip pan 24A and the position of vent pipe 22 and cover plate 36A relative to the drip pan opening 34A when the vapor generator is cold, and the position of vent pipe 22 and cover plate 36A, as shown by phantom lines, when the vapor generator 10 is fully heated.

Figure 4:
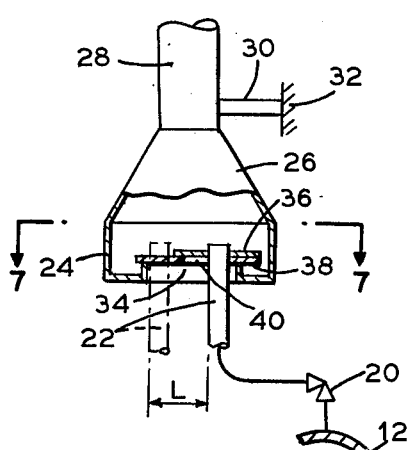
FIG. 4 is a sectional elevation of a drip pan embodying the invention.

Referring to FIG. 4, there is shown the safety valve 20 and the vent pipe 22 associated with an annular shaped drip pan 24 which, in accordance with the invention, has a horizontal cross-sectional area considerably smaller than that of the prior art drip pan 24A while maintaining the horizontal cross-sectional area of opening 34 the same as that of opening 34A so as to admit the vent pipe 22 and to accommodate horizontal movement thereof occasioned by expansion and contraction of the vapor drum 12 and the vapor generator 10, as the latter is placed into or taken out of service. A hood 26 interconnects the drip pan 24 to the exhaust pipe 28. The drip pan 24, the hood 26 and the exhaust pipe 28 are joined with one another to form a unitary construction which is secured, through an appropriate brace 30, to a fixed framework 32.

In accordance with the invention, the drip pan 24 houses an upper and a lower annular cover plate 36 and 38 cooperating with one another to maintain a tight closure over the drip pan opening 34 throughout the movement (L) of vent pipe 22 from its position with a cold vapor generator to the position, as shown by phantom lines, when the vapor generator is fully heated. The upper cover plate 36 is slidably fitted to the outlet end portion of vent pipe 22 and the lower cover plate 38 is slidably interposed between the drip pan 24 and the upper plate 36. The lower cover plate 38 includes an opening 40 and is fitted so as to maintain very close contact with the underside of cover plate 36 and the upturned inner edge of drip pan 24 throughout the movement of vent pipe 22 thereby preventing the leakage of vapor and/or condensate across the sliding surfaces.

Figure 5:
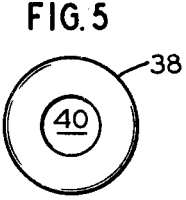
FIG. 5 is a plan view of the lower cover plate.

Referring to FIG. 5, there is shown the lower cover plate 38 formed with an opening 40 which admits the vent pipe 22 and is sized to preferably accommodate approximately one-half the maximum horizontal movement of vent pipe 22 occasioned by expansion and contraction of the vapor drum 12 and the vapor generator 10 as the latter is placed into or taken out of service.

Figure 6:
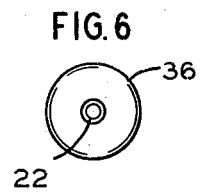
FIG. 6 is a plan view of the upper cover plate.

Referring to FIG. 6, there is shown the upper cover plate 36 which is slidably fitted to the outlet end portion of vent pipe 22 to allow for vertical movement of vent pipe 22 occasioned by expansion and contraction of the vapor drum 12 and the vapor generator 10 as the latter is placed into or taken out of service. The upper cover plate 36 has a horizontal cross-sectional area which is greater than that of the lower cover plate opening 40.

Figure 7:
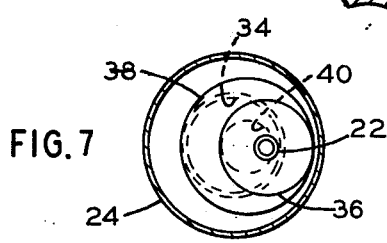
FIG. 7 is a plan view taken along line 7—7 of FIG. 4 and showing the vent pipe and cover plate positions with a cold vapor generator.

Referring to FIG. 7, there is shown the drip pan 24 and the position of vent pipe 22 and cover plates 36 and 38 relative to one another and to the openings 34 and 40 when the vapor generator 10 is shutdown and cold.

Figure 7A:
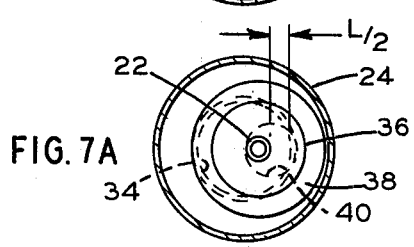
FIG. 7A is a plan view taken along line 7—7 of FIG. 4 and showing the vent pipe and cover plate positions with a partially heated vapor generator.

Referring to FIG. 7A, there is shown the drip pan 24 and the vent pipe 22 which has traversed one-half the diametrical clearance (L/2) of the drip pan opening 34 and the full diametrical clearance of the lower cover plate opening 40 as a result of initial expansion of the vapor generator 10 after the latter has been placed into service and partially heated. The upper cover plate 36 has moved with the vent pipe 22 by sliding across the lower cover plate 38.

Figure 7B:
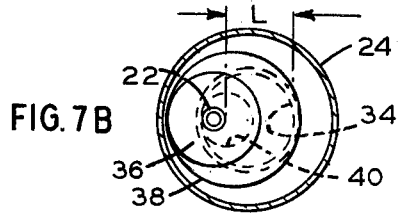
FIG. 7B is a plan view taken along line 7—7 of FIG. 4 and showing the vent pipe and cover plate positions with a fully heated vapor generator.

Referring to FIG. 7B, there is shown the drip pan 24 and the vent pipe 22 which has traversed the full diametrical clearance (L) of the drip pan opening 34 as well as that of lower cover plate opening 40 as a result of the maximum expansion of the vapor drum 12 and vapor generator 10 occasioned by the latter having been fully heated. The lower cover plate 38 has moved with the vent pipe 22 by sliding across the upturned inner edge of drip pan 24.

In the operation of the present invention, the vent pipe 22 and the safety valve 20 are free to move with the expansion and contraction of the vapor drum 12 and the vapor generator 10 occasioned by the latter being placed into or taken out of service.

When the vapor generator 10 is placed into service and during the initial heating stage, the vent pipe 22 traverses across one-half the diametrical clearance of the drip pan opening 34 and across the full diametrical clearance of the lower cover plate opening 40. During the final heating stage, the lower cover plate 38 is caused to move so as to allow the vent pipe 22 to traverse across the other half of the drip pan opening 34.

When the vapor generator 10 is taken out of service and cooled, the sequence of vent pipe movement with respect to the openings 34 and 40 and the cover plate 38 is the same as the expansion movement except that it is in the opposite direction.

During operation of the safety valve 20, the released vapor is conveyed through the vent pipe 22 to the drip pan 24, which collects condensate drippings and thence through the exhaust pipe 28 for discharge to atmosphere or to an auxiliary vessel, not shown.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

The embodiments of the invention in which an exclusive property or privilege is claimed are defined as follows:

1. In combination with a pressurized vapor containment, means for heating the vapor, said containment being free to move in response to thermal expansion and contraction, a pressure relief valve connected to said containment to release vapor therefrom, a vent pipe connected to said valve to receive the released vapor, a fixed exhaust pipe communicating with said vent pipe to dispose of the vapor being discharged therefrom, and a fixed annular drip pan surrounding the vent pipe and communicating with the exhaust pipe to collect condensate drippings, the pan having an opening sized to allow for relative vent pipe movement occasioned by containment movement, the drip pan opening being covered by upper and lower annular plates surrounding the vent pipe, the lower plate being slidably interposed between said drip pan and upper plate, the lower plate having an opening sized to allow for an initial movement of the vent pipe, and said lower plate being movable to accommodate the remainder of said vent pipe movement.

2. The combination according to claim 1 wherein the upper plate has a horizontal cross-sectional area greater than the horizontal cross-sectional area of the opening of said lower plate.

3. The combination according to claim 1 wherein the upper plate is slidably fitted to said vent pipe.

4. The combination according to claim 1 wherein the lower plate opening is sized to allow for approximately one-half the total movement of said vent pipe.

5. The combination according to claim 1 including a hood interconnecting the drip pan to said exhaust pipe.

* * * * *

UNITED STATES PATENT AND TRADEMARK OFFICE
CERTIFICATE OF CORRECTION

PATENT NO. : 4,008,734
DATED : February 22, 1977
INVENTOR(S) : Nobuo Shimono et al It is certified that error appears in the above-identified patent and that said Letters Patent are hereby corrected as shown below:

For the Assignee, "The Babcock & Wilcox Company" should read --Babcock & Wilcox, Limited--.

Signed and Sealed this

Tenth Day of May 1977

[SEAL]

Attest:

RUTH C. MASON
Attesting Officer

C. MARSHALL DANN
Commissioner of Patents and Trademarks